(12) United States Patent
    Putzig

(10) Patent No.: US 7,026,434 B1
(45) Date of Patent: Apr. 11, 2006

(54) POLYESTER AND PROCESS THEREFOR

(75) Inventor: Donald Edward Putzig, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 323 days.

(21) Appl. No.: 10/686,256

(22) Filed: Oct. 15, 2003

Related U.S. Application Data

(62) Division of application No. 10/254,298, filed on Sep. 25, 2002, now Pat. No. 6,774,204.

(60) Provisional application No. 60/324,864, filed on Sep. 26, 2001.

(51) Int. Cl.
    *C08G 63/78* (2006.01)
    *C08K 3/18* (2006.01)

(52) U.S. Cl. .................. 528/275; 528/281; 528/282; 528/308; 528/308.6; 524/779; 524/783; 524/786; 524/788; 524/404; 524/430; 524/432; 524/433

(58) Field of Classification Search ............... 528/275, 528/281, 282, 308, 308.6; 524/779, 783, 524/786, 788, 404, 430, 432, 433
    See application file for complete search history.

(56) References Cited

U.S. PATENT DOCUMENTS

| 5,372,879 A | 12/1994 | Handa et al. |
| 5,958,568 A | 9/1999 | Mizutani et al. |
| 6,113,997 A | 9/2000 | Massey et al. |
| 6,346,070 B1 | 1/2002 | Ohmatsuzawa et al. |

FOREIGN PATENT DOCUMENTS

| JP | 10182805 A | 7/1998 |
| WO | WO 0130900 A1 | 5/2001 |

*Primary Examiner*—Samuel A. Acquah

(57) ABSTRACT

A composition and a process for producing the composition are disclosed. The composition comprises (1) repeat units derived from a carbonyl compound and a glycol and (2) one or more ultrafine metal oxides. The process can comprise (1) contacting, in the presence of a catalyst and optionally one or more ultrafine metal oxides, a carbonyl compound such as dicarboxylic acid with a glycol under a condition sufficient to produce polyester wherein the glycol can be pretreated with a metal oxide or (2) incorporating an ultrafine metal oxide into or onto polyester. Also disclosed is a process for substantially removing, or reducing the content of, an aldehyde in a glycol which comprises contacting the glycol with at least one metal oxide.

20 Claims, No Drawings

POLYESTER AND PROCESS THEREFOR

This is a division of application Ser. No. 10/254,298, filed Sep. 25, 2002, now U.S. Pat. No. 6,774,204.

CROSS REFERENCE TO RELATED APPLICATION

This application claims the priority benefit of U.S. Provisional Application 60/324,864, filed Sep. 26, 2001.

FIELD OF THE INVENTION

This invention relates to a polyester composition comprising an ultrafine metal oxide, to a process for producing the composition, to a process for substantial removal or reduction in the amount of aldehyde in polyester, and to a process for producing polyester using a glycol that has been pretreated with a metal oxide.

BACKGROUND OF THE INVENTION

Polyesters are an important class of industrial chemicals. For example, polyalkylene terephthalates, derived from dicarboxylates and glycols, are widely used in thermoplastic fibers, films and molding applications because of their excellent physical properties and surface appearance. Polyethylene terephthalate (PET) is the most important commercial polyester within this class of polymers.

Polyethylene terephthalate is commonly prepared by one of two routes: (1) transesterification of dimethyl terephthalate (DMT) with ethylene glycol to form the intermediate bis-hydroxyethyl terephthalate, followed by polymerization (polycondensation) to form the polyethylene terephthalate; or (2) by direct esterification of terephthalic acid (TPA) with ethylene glycol, again followed by the polymerization step. Excess ethylene glycol is then typically recovered and recycled. Typically the transesterification (or esterification) and polymerization steps are carried out in the presence of one or more catalysts to produce a molten PET. The molten PET is then extruded and/or formed into the desired product. The polymerization and processing steps are carried out at a high temperature, for example, in the range of 200°–300° C. Under these conditions, some breakdown of the polymer occurs, leading to the formation of small amounts of aldehydic impurities such as acetaldehyde. These impurities may end up in the PET, or in the recovered ethylene glycol.

One of the major applications for PET resins is that of containers for potable beverages such as soft drinks, juices and water. Once having been formed in the PET polymer, any acetaldehyde in the container migrates over a period of time into the beverage. Even a trace amount of acetaldehyde gives the beverage an unpleasant aroma or taste, particularly noticeable in the case of mineral water. This problem has been minimized by the use of low molecular weight PET, reduction in exposure to heat during processing, and use of amine-based acetaldehyde scavengers, but these approaches have been only partially successful.

An additional problem caused by the presence of acetaldehyde in PET is color formation. This problem can be partly caused by acetaldehyde interaction with titanium compounds, frequently used as catalysts in producing PET.

For example, U.S. Pat. No. 6,113,997 discloses producing a melt-polymerized prepolymer having an intrinsic viscosity of 0.38–0.46 dl/g followed by solid-state polymerization to a polymer with an intrinsic viscosity of 0.60–0.90 dl/g and an acetaldehyde content equal to or less than 1 ppm.

WO 01/30900 discloses a process for reducing acetaldehyde content in a beverage in a polyester-based container by incorporating an oxidation catalyst active for the oxidation of acetaldehyde to acetic acid.

However, there is a constant need for new polyester substantially free of an aldehyde compound.

SUMMARY OF THE INVENTION

An embodiment of the invention provides a composition that comprises (1) repeat units derived from a carbonyl compound and a glycol and (2) at least one ultrafine metal oxide.

Another embodiment of the invention provides a process for producing polyester, which comprises contacting, in the presence of a catalyst and optionally at least one ultrafine metal oxide, a carbonyl compound with a glycol under a condition sufficient to produce polyester.

Further an embodiment of the invention provides a process for substantially removing, or reducing the content of, aldehyde in polyester wherein the process comprises (1) contacting, in the presence of a catalyst and at least one ultrafine metal oxide, a carbonyl compound with a glycol under a condition sufficient to produce polyester or (2) incorporating at least one ultrafine metal oxide into or onto the polyester.

Still another embodiment of the invention provides a process for producing polyester, which comprises contacting, in the presence of a catalyst and optionally at least one ultrafine metal oxide, a carbonyl compound with a glycol under a condition sufficient to produce polyester wherein the glycol has been pretreated with at least one metal oxide.

DETAIL DESCRIPTION OF THE INVENTION

According to the invention, the composition can comprise or consist essentially of (1) repeat units derived from a carbonyl compound and a glycol and (2) at least one ultrafine metal oxide. The term "ultrafine" means a particle size smaller than about 0.1 mm, preferable smaller than about 0.05 mm, more preferable smaller than about 0.01 mm, and most preferably smaller than about 100 nanometers (100 nm).

Any carbonyl compound, which when combined with a glycol, can produce an ester or polyester that can be used to derive the repeat unit. Generally, such carbonyl compounds include, but are not limited to, acids, esters, amides, acid anhydrides, acid halides, salts of carboxylic acid oligomers or polymers having repeat units derived from an acid, or combinations of two or more thereof. The presently preferred acid is an organic acid such as a carboxylic acid or salt thereof. An oligomer of a carbonyl compound and glycol generally has a total of about 2 to about 10 repeat units derived from the carbonyl compound and glycol.

The organic acid or ester thereof can have the formula of RCO(O)R in which each R independently can be (1) hydrogen; (2) hydrocarboxyl radical having a carboxylic acid group at the terminus; (3) hydrocarbyl radical in which each radical has 1 to about 30, preferably about 3 to about 15 carbon atoms per radical which can be alkyl, alkenyl, aryl, alkaryl, aralkyl radical, or combinations of two or more thereof; or (4) combinations of two or more thereof. The presently preferred organic acid has the formula of $HO_2CACO_2H$ in which A is an alkylene group, an arylene group, an alkenylene group, or combinations of two or more thereof. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. The presently preferred organic diacid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof. The preferred ester is dimethyl terephthalate.

Examples of carboxylic acid metal salts or esters thereof includes a 5-sulfo isophthalate metal salt and its ester having the formula of $(R^1O_2C)_2ArS(O)_2OM$ in which each $R^1$ can be the same or different and is hydrogen or an alkyl group containing 1 to about 6, preferably 2, carbon atoms. Ar is a phenylene group. M can be an alkali metal ion such as sodium. An example of the ester is bis-glycolate ester of 5-sulfo isophthalate sodium salt.

Any glycol that can esterify an acid to produce an ester or polyester can be used in the present invention. The presently preferred glycol has the formula of $R^1(OH)_n$, an alkylene glycol of the formula $(HO)_nA(OH)_n$ or combinations thereof in which $R^1$ and A are the same as those disclosed above while n is a number between about 1 and 10. Examples of suitable glycols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently most preferred glycol is an alkylene glycol such as ethylene glycol for the polyester produced therefrom has a wide range of industrial applications.

Any ultrafine metal oxide that can substantially reduce an aldehyde content in, or remove an aldehyde from, polyester or a liquid can be used. Examples of such metal oxides include, but are not limited to beryllium oxide, magnesium oxide, calcium oxide, strontium oxide, barium oxide, boron oxide, aluminum oxide, gallium oxide, zinc oxide, and combinations of two or more thereof.

These metal oxides can be produced by any methods known to one skilled in the art such as, for example, sol gel technology as disclosed in Chem. Eur. J., 2001, 7, No. 12, pages 2505–2510 (E. Lucas et al; entitled "Nanocrystalline Metal Oxides as Unique Chemical Reagents/Sorbents"). The method is incorporated herein by reference. The metal oxides can also be obtained commercially.

The molar ratio of the repeat units derived from carbonyl compound to the repeat units derived from glycol can be about 1:1 to about 10:1, preferably about 1:1 to about 5:1, and most preferably 1:1 to 4:1. The metal oxide can be present in the composition in the range of from about 0.00001 to about 10, preferably about 0.0001 to about 5, and more preferably 0.0005 to 1 percent by weight.

The composition can be produced by any means known to one skilled in the art. For example, any known processes for producing polyester can be used. The metal oxide can be introduced into an esterification, transesterification, or polycondensation medium with a carbonyl compound, a glycol, or both and optionally a catalyst. The metal oxide can also be combined with polyester resin by, for example, extrusion, to incorporate the metal oxide into the resin. The metal oxide can also be incorporated onto a polyester resin by spraying or spreading slurry of the metal oxide in a solvent such as water or a glycol illustrated above onto the resin. The metal oxide can also be supported on or compressed into the polyester by any means known to one skilled in the art. The metal oxide can also be introduced during injection molding.

According to another embodiment of the invention, a process for producing polyester comprises contacting, in the presence of a catalyst, a carbonyl compound such as dicarboxylic acid with a glycol. One or more ultrafine metal oxides disclosed above can be introduced before the polycondensation stage or after the polycondensation stage. One or more metal oxides can also be included as a mixture with the carbonyl compound or glycol or both. Alternatively, the metal oxide can be incorporated into or onto the polyester by the means disclosed above.

A cobalt, antimony, manganese, titanium, or zinc catalyst is commonly employed in the manufacture of polyester. A preferred catalyst comprises antimony or titanium. Examples of suitable antimony catalysts include, but are not limited to, antimony oxide, antimony acetate, antimony hydroxide, antimony halide, antimony sulfide, antimony carboxylate, antimony ether, antimony glycolate, antimony alcoholate, antimony nitrate, antimony sulfate, antimony phosphate, and combinations of two or more thereof. The presently preferred titanium compounds are organic titanium compounds. Titanium tetrahydrocarbyloxides are presently most preferred organic titanium compounds because they are readily available and effective. Examples of suitable titanium tetrahydrocarbyloxide compounds include those expressed by the general formula $Ti(OR)_4$ where each R is independently selected from the group consisting of an alkyl radical, a cycloalkyl radical, an aralkyl hydrocarbon radical, and combinations of two or more thereof. Each radical can contain from 1 to about 30, preferably 2 to about 18, and most preferably 2 to 12 carbon atoms per radical and each R can be the same or different. Examples of titanium catalysts include, but are not limited to, TYZOR® compounds such as, for example, TYZOR® TPT and TYZOR® TBT (tetra isopropyl titanate and tetra n-butyl titanate, respectively) available from E.I. du Pont de Nemours and Company, Wilmington, Del. and those disclosed in U.S. Pat. Nos. 6,066,714; 6,075,115; 6,080,834; 6,166,170; 6,255,441. The disclosures of these patents are incorporated herein by reference. The catalyst composition can further comprise a cocatalyst. Examples of cocatalysts include, but are not limited to, cobalt/aluminum catalysts, antimony compounds, and combinations thereof. The cobalt/aluminum catalyst comprises a cobalt salt and an aluminum compound in which the mole ratio of aluminum to cobalt is in the range of from 0.25:1 to 16:1 as disclosed in U.S. Pat. No. 5,674,801.

The carbonyl compound and glycol are the same as those disclosed above. The contacting of the carbonyl compound and glycol can be carried out by any suitable means. Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the glycol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 4:1. The metal oxide can be present in such amount disclosed above.

A preferred process comprises, consists essentially of, or consists of contacting a reaction medium with a catalyst disclosed above in the first embodiment of the invention. The reaction medium can comprise, consist essentially of, or consist of a carbonyl compound, a glycol, an ultrafine metal oxide, and optionally a phosphorus compound that is known to reduce the color of polyester.

Examples of suitable phosphorus compounds include, but are not limited to, a hypophosphorous acid or salt thereof, polyphosphoric acid or salt thereof, phosphonate ester, pyrophosphoric acid or salt thereof, a pyrophosphorous acid or salt thereof, and combinations of two or more thereof.

According to the third embodiment of the invention, a process for substantially removing, or reducing the content of, aldehyde in polyester can be the same as the process disclosed above in the second embodiment of the invention or comprise incorporating at least one ultrafine metal oxide into or onto polyester by means disclosed above.

The invention is directed to substantially removing or reducing an aldehyde such as formaldehyde, acetaldehyde, crotonaldehyde. 2,6-hexadienal, propionaldehyde, butraldehyde, valeraldehyde, and caproaldehyde depending on the glycol used in the process. For example, acetaldehyde can be formed if ethylene glycol is used to produce PET. Aldehyde can be in any fluid form such as, for example, gas, liquid, or both.

According to the fourth embodiment of the invention, a process for producing polyester is provided. The process comprises contacting, in the presence of a catalyst and optionally at least one ultrafine metal oxide, a carbonyl compound such as dicarboxylic acid with a pretreated glycol.

The pretreated glycol can be obtained by contacting a glycol, either freshly obtained from a commercial vendor or recycled from a polyester production process, with a metal oxide. The metal oxide can be the same as that disclosed above. However, the metal oxide does not have to be ultrafine particles. Ultrafine particles can improve the pretreatment because of their high surface area.

The contacting of a fresh or recycled glycol can be carried out by any methods known to one skilled in the art. It is preferred that glycol be contacted with a bed of at least one metal oxide disclosed above. The contacting can also be carried out by mixing the metal oxide with glycol to form a slurry. For example, a glycol can be passed through a column packed with metal oxide, a support material having metal oxide supported thereon, pelletized metal oxide adsorbent, or a fluidized bed of metal oxide, to substantially remove aldehyde in the glycol. The pretreated glycol can then be used in the process of the invention.

For example, U.S. Pat. No. 6,093,236 discloses pelletized adsorbent compositions made by pressing nanocrystalline metal hydroxides or oxides, The description of the patent is incorporated herein by reference.

The carbonyl compound, catalyst, metal oxide, and process conditions for the fourth embodiment of the invention can be the same as those disclosed above.

EXAMPLES

The examples provided below are intended to further illustrate the invention and are not to be construed as to unduly limit the scope of the invention.

A standard 100 ppm ethylene glycol solution of 2,6-hexadienal was prepared. Then 250 gm of this solution was slurried with 5 gm of either (A) nanoparticle magnesium oxide supplied by Nanoscale Materials Inc., Manhattan, Kans.; or (B) 325 mesh magnesium oxide, from Aldrich (Milwaukee, Wis.). The slurries were stirred for 1 hour at 25° C., 50° C. or 100° C. and then analyzed by GC for residual 2,6-hexadienal presented in the following table as parts per million by weight (ppm).

| Sample | Temperature (° C.) | 2,6-hexadienal[a] |
|---|---|---|
| 95 (standard) | | 100 |
| 95A[b] | 25 | 22 |
| 95B[c] | 25 | 21 |
| 95C[b] | 50 | 14 |
| 95D[c] | 50 | 16 |
| 95E[b] | 100 | 8.4 |
| 95F[c] | 100 | 7.2 |

[a]hexadienal is the aldol condensation product of acetaldehyde.
[b]magnesium oxide having nano-iszed particles.
[c]mesh magnesium oxide having particles sieved through 325 mesh screen having an opening of 44 microns (0.044 mm).

The results show that use of magnesium oxide substantially removed 2,6 hexadienal from ethylene glycol.

What is claimed is:

1. A process for substantially removing, or reducing the content of, an aldehyde in a glycol comprising contacting said glycol with at least one metal oxide.

2. A process according to claim 1 wherein said metal oxide is beryllium oxide, magnesium oxide, calcium oxide, strontium oxide, barium oxide, boron oxide, aluminum oxide, gallium oxide, zinc oxide, or combinations of two or more thereof.

3. A process according to claim 2 wherein said metal oxide is magnesium oxide or ultrafine magnesium oxide.

4. A process according to claim 3 wherein said aldehyde is acetaldehyde and said glycol is ethylene glycol.

5. A process according to claim 1 wherein said contacting produces a metal oxide-treated glycol and said process further comprises contacting, optionally in the presence of at least one ultrafine metal oxide, a carbonyl compound with said metal oxide-treated glycol under a condition sufficient to produce polyester.

6. A process according to claim 5 wherein said contacting is carried in the presence of said ultrafine metal oxide, which has a particle size smaller than about 0.05 mm.

7. A process according to claim 5 wherein said contacting is carried in the presence of said ultrafine metal oxide, which has a particle size smaller than about 100 nm.

8. A process according to claim 5 wherein said contacting is carried in the presence of said ultrafine metal oxide and said ultrafine metal oxide or said metal oxide is beryllium oxide, magnesium oxide, calcium oxide, strontium oxide, barium oxide, boron oxide, aluminum oxide, gallium oxide, zinc oxide, or combinations of two or more thereof.

9. A process according to claim 6 wherein said ultrafine metal oxide or said metal oxide is magnesium oxide.

10. A process according to claim 7 wherein said ultrafine metal oxide or said metal oxide is magnesium oxide.

11. A process according to claim 10 wherein said carbonyl compound is terephthalic acid or ester thereof and said glycol is ethylene glycol.

12. A process according to claim 5 further comprising incorporating said at least one ultrafine metal oxide into or onto said polyester.

13. A process according to claim 12 wherein said ultrafine metal oxide or said metal oxide is beryllium oxide, magnesium oxide, calcium oxide, strontium oxide, barium oxide, boron oxide, aluminum oxide, gallium oxide, zinc oxide, or combinations of two or more thereof.

14. A process according to claim 13 wherein said ultrafine metal oxide or said metal oxide is magnesium oxide.

15. A process according to claim 14 wherein said polyester is polyethylene terephthalate.

16. A process comprising (1) contacting a glycol with a metal oxide to produce a metal oxide-treated glycol, (2) contacting a carbonyl compound with said metal oxide-treated glycol to produce polyester, and (3) contacting said polyester with an ultrafine metal oxide.

17. A process according to claim 16 wherein said glycol is ethylene glycol and said carbonyl compound is terephthalic acid or dimethyl terephthalate.

18. A process according to claim 17 wherein said metal oxide is beryllium oxide, magnesium oxide, calcium oxide, strontium oxide, barium oxide, boron oxide, aluminum oxide, gallium oxide, zinc oxide, or combinations of two or more thereof.

19. A process according to claim 13 wherein said metal oxide is magnesium oxide.

20. A process according to claim 19 wherein said metal oxide has a particle size smaller than about 100 nm.

* * * * *